May 4, 1926.

W. E. WHITNEY

FALSE TOOTH FOR SAWS

Filed May 29, 1925

1,583,765

INVENTOR.
William E. Whitney,
BY
Hood + Hahn
ATTORNEYS

Patented May 4, 1926.

1,583,765

UNITED STATES PATENT OFFICE.

WILLIAM E. WHITNEY, OF HELMSBURG, INDIANA, ASSIGNOR TO E. C. ATKINS & COMPANY, OF INDIANAPOLIS, INDIANA, A CORPORATION OF INDIANA.

FALSE TOOTH FOR SAWS.

Application filed May 29, 1925. Serial No. 33,632.

*To all whom it may concern:*

Be it known that I, WILLIAM E. WHITNEY, a citizen of the United States, residing at Helmsburg, in the county of Brown and State of Indiana, have invented a new and useful False Tooth for Saws, of which the following is a specification.

My invention relates to improvements in saws and particularly to means for causing a saw to feed through an automatic sharpening machine in event a tooth on the saw is broken.

One of the objects of my invention is to provide a false tooth to be attached to the saw at the point where the tooth is broken off so that when the saw is automatically fed through the sharpening machine means will be provided at the broken tooth for the feeding mechanism to engage and properly space the saw.

For the purpose of disclosing my invention I have illustrated one embodiment thereof in the accompanying drawings in which—

Figure 1:
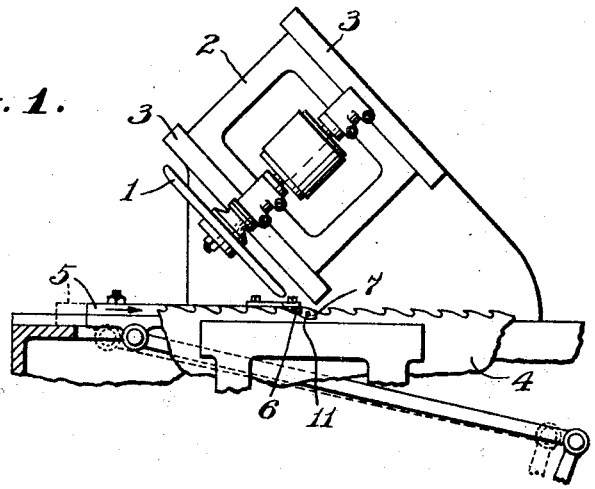
Fig. 1 is a fragmentary elevation showing so much of an automatic sharpener as is necessary for understanding the application of my invention.
Figure 2:
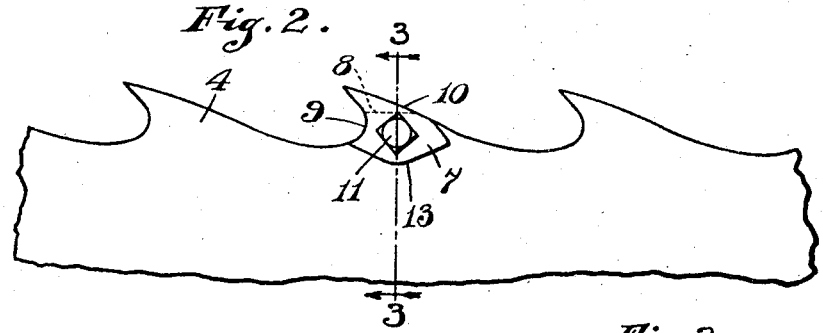
Fig. 2 is a side elevation of a saw showing the false tooth in position.
Figure 4:
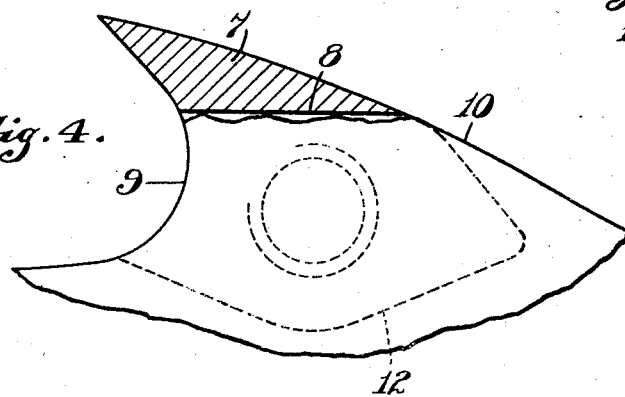
Fig. 4 is a detail section on the line 4—4 of Fig. 3.
Figure 3:
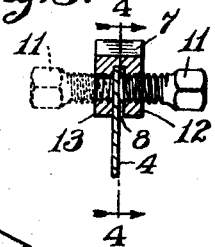
Fig. 3 is a sectional view on the line 3—3 of Fig. 2.

In certain types of automatic saw sharpening machines there is provided, as illustrated in Fig. 1, a grinding wheel 1, the shaft of which is mounted on a sliding carriage 2, which carriage is adapted to be moved in guideways 3 toward and from the saw 4. The wheel 1 is set at the proper angle for grinding the teeth one at a time, and for the purpose of feeding the saw a reciprocating saw engaging feeder 5 is provided. This feeder has a suitable finger 6 adapted to engage a tooth of the saw and as the carriage is moved in the direction of the arrow feeds the saw one tooth forward. The parts are automatically operated so that for sharpening the saw it is only necessary to insert the saw in position and start the apparatus, after which the saw will be automatically fed through and the teeth properly ground or sharpened.

It sometimes happens, however, that in use one of the teeth will be broken off, in which event, due to the fact that the saw is fed by the engagement of the feeding mechanism with the teeth, the feeding mechanism will skip when the broken teeth come into position and thereby the mechanism will be thrown out of proper synchronism. To prevent this and provide a means at the broken tooth for engagement by the feeding mechanism, I provide a false tooth 7 which is substantially of the same shape as the teeth of the saw and is provided with a slot 8 to receive the unbroken portion of the saw tooth. The false tooth 7 is substantially the same shape as a completed tooth of the saw, being provided with the usual rounded throat 9 and the inclined back 10 so that when the tooth is fitted in position at the broken point the false tooth will match up with the remaining teeth.

The tooth is held in position by means of a set screw 11 which screws through either of the side portions 12 and 13 and abuts against the side of the saw so that the false tooth will be securely locked in position and may be secured by the set screw from either side.

I claim as my invention:

1. As a new article of manufacture, a false feeding tooth for broken saw teeth comprising a crown portion conforming to the shape of the portion of the tooth broken off and a body portion secured to the unbroken portion of the tooth and coinciding therewith.

2. As a new article of manufacture, a false feeding tooth for saws provided with a base portion arranged to straddle the saw at a point where a tooth is broken off, and means for securing said tooth to the saw.

3. As a new article of manufacture, a false feeding tooth for saws adapted to be secured to the saw at a point where a tooth is broken off and comprising a member having substantially the same contour as the tooth of the saw provided with a base slotted to receive the saw blade and a screw threaded into said base and arranged to abut against the saw blade and clamp the tooth in position.

In testimony whereof, I, WILLIAM E. WHITNEY, have hereunto set my hand at Helmsburg, Indiana, this 21st day of May, 1925, A. D. one thousand nine hundred and twenty-five.

WILLIAM E. WHITNEY.